(12) United States Patent
Main et al.

(10) Patent No.: US 8,032,410 B2
(45) Date of Patent: Oct. 4, 2011

(54) MULTIPLE OFFER COUPON

(75) Inventors: Renee Main, Chaska, MN (US); David J. Semersky, Minneapolis, MN (US); Nissa Miller, St. Louis Park, MN (US); Lara J. Pozorski, Minneapolis, MN (US); Edward C. Ampe, Brooklyn Park, MN (US); Subodh K. Samal, Shakopee, MN (US); Scott R. Hamilton, St. Louis Park, MN (US)

(73) Assignee: Target Brands, Inc., Minneapolis, MN (US)

( * ) Notice: Subject to any disclaimer, the term of this patent is extended or adjusted under 35 U.S.C. 154(b) by 1384 days.

(21) Appl. No.: 11/528,501

(22) Filed: Sep. 27, 2006

(65) Prior Publication Data

US 2008/0077484 A1 Mar. 27, 2008

(51) Int. Cl.
*G06Q 30/00* (2006.01)
(52) U.S. Cl. ...................................... 705/14.1
(58) Field of Classification Search .................. 705/14.1
See application file for complete search history.

(56) References Cited

U.S. PATENT DOCUMENTS

| | | | |
|---|---|---|---|
| 4,195,864 A * | 4/1980 | Morton et al. | |
| 4,554,446 A | 11/1985 | Murphy et al. | |
| 4,601,490 A | 7/1986 | Brandon | |
| 4,791,281 A | 12/1988 | Johnsen et al. | |
| 4,908,761 A | 3/1990 | Tai | |
| 5,056,019 A | 10/1991 | Schultz et al. | |
| 5,139,286 A * | 8/1992 | Gold | |
| 5,173,851 A | 12/1992 | Off et al. | |
| 5,192,854 A | 3/1993 | Counts | |
| 5,201,010 A | 4/1993 | Deaton et al. | |
| 5,353,218 A | 10/1994 | De Lapa et al. | |
| 5,369,571 A | 11/1994 | Metts | |
| 5,501,491 A | 3/1996 | Thompson | |
| 5,531,482 A * | 7/1996 | Blank | |
| 5,581,064 A | 12/1996 | Riley et al. | |
| 5,644,723 A * | 7/1997 | Deaton et al. | 705/14.41 |
| 5,687,322 A | 11/1997 | Deaton et al. | |

(Continued)

FOREIGN PATENT DOCUMENTS

EP 0331442 A2 9/1989

(Continued)

OTHER PUBLICATIONS

Images of Mailer with Removable Coupon, publicly distributed Mar. 28, 2005 (2 pgs.).*

(Continued)

*Primary Examiner* — Daniel Lastra
(74) *Attorney, Agent, or Firm* — Griffiths & Seaton PLLC

(57) ABSTRACT

A coupon system includes a coupon identification code, a database, and a point-of sale terminal. The database stores at least a portion of the coupon identification code linked to a plurality of offers for commercial advantages. The point-of-sale terminal is in communication with the database. During use, the coupon identification code is entered into the point-of-sale terminal, and of the point-of-sale terminal is adapted to determine the plurality of offers linked with the coupon identification code and terms for redeeming one or more of the plurality of offers based at least in part on reference to the database such that the point-of-sale terminal discounts a current purchase based upon the terms for redeeming the one or more plurality of offers. Other coupons and related systems and methods also disclosed.

26 Claims, 10 Drawing Sheets

U.S. PATENT DOCUMENTS

| | | | |
|---|---|---|---|
| 5,710,886 A | | 1/1998 | Christensen et al. |
| 5,822,735 A | | 10/1998 | De Lapa et al. |
| 5,832,457 A | | 11/1998 | O'Brien et al. |
| 5,857,175 A | | 1/1999 | Day et al. |
| 5,865,470 A | * | 2/1999 | Thompson |
| 5,905,246 A | | 5/1999 | Fajkowski |
| 5,974,396 A | | 10/1999 | Anderson et al. |
| 5,995,942 A | * | 11/1999 | Smith et al. ............... 705/14.26 |
| 6,009,411 A | * | 12/1999 | Kepecs ...................... 705/14.17 |
| 6,026,370 A | | 2/2000 | Jermyn |
| 6,050,493 A | * | 4/2000 | Fertig |
| 6,089,611 A | * | 7/2000 | Blank |
| 6,230,143 B1 | | 5/2001 | Simons et al. |
| 6,241,287 B1 | * | 6/2001 | Best et al. |
| 6,328,339 B2 | | 12/2001 | Dixon, III et al. |
| 6,336,099 B1 | | 1/2002 | Barnett et al. |
| 6,340,179 B2 | | 1/2002 | Mitchell |
| 6,424,949 B1 | | 7/2002 | Deaton et al. |
| 6,484,146 B2 | | 11/2002 | Day et al. |
| 6,568,599 B2 | * | 5/2003 | Lahey et al. |
| 6,623,039 B2 | * | 9/2003 | Thompson et al. |
| 6,974,159 B2 | * | 12/2005 | Thompson et al. |
| 7,040,049 B2 | * | 5/2006 | Cox et al. |
| 2001/0014868 A1 | | 8/2001 | Herz et al. |
| 2001/0042008 A1 | | 11/2001 | Hull et al. |
| 2002/0161643 A1 | | 10/2002 | Tai |
| 2002/0165769 A1 | * | 11/2002 | Ogaki et al. |
| 2003/0135414 A1 | * | 7/2003 | Tai ................................ 705/14 |
| 2004/0026916 A1 | * | 2/2004 | Thompson et al. |
| 2004/0039633 A1 | * | 2/2004 | Nicholson |
| 2004/0217858 A1 | * | 11/2004 | Mitchell |
| 2004/0249712 A1 | * | 12/2004 | Brown et al. ................ 705/14 |
| 2005/0149394 A1 | * | 7/2005 | Postrel ........................ 705/14 |
| 2005/0154641 A1 | * | 7/2005 | Mortimer |
| 2005/0240478 A1 | * | 10/2005 | Lubow et al. ............... 705/14 |

FOREIGN PATENT DOCUMENTS

| | | |
|---|---|---|
| WO | 89/07868 | 8/1989 |
| WO | 03/083622 A2 | 10/2003 |

OTHER PUBLICATIONS

Do Plastic Coupon Cards Improve Direct Response, Aug. 2004 (1 pg.).*

Card w/A-Peel, Ocotober 2003 (6 pgs.).*

* cited by examiner

MULTIPLE OFFER COUPON

BACKGROUND OF THE INVENTION

Coupons have been used for decades to encourage consumers to patronize a particular business or to buy a particular product. In general, coupons entitle consumers to receive a commercial advantage such as a discount on a particular purchase. Conventional coupons are presented to consumers such that each offer for a commercial advantage is included on a different coupon accompanied by a different offer code such as a bar code, etc. configured to identify the offer to a point-of-sale terminal (e.g., a personal computer or other device accessing a retail website, a check-out terminal or kiosk, etc.). In this manner, a consumer wishing to receive a plurality of commercial advantages generally must present a plurality of discrete coupons at the point-of-sale terminal where each coupon corresponds with a different product being purchased or otherwise corresponds to a discount for which the purchase is eligible.

Coupon collection has become increasingly difficult as avenues for distributing coupons have grown. For example, coupons are commonly distributed by direct mail, point-of-sale displays, handouts, newspaper and magazine advertisements, printed matter on products such as sales receipts, circulated through direct retail sale, email or web distribution, and in other ways. As a result, in order to find coupons corresponding to products that interest a consumer, the consumer may be required to search through a large volume of material. In addition, once coupons are collected, a consumer is required to store the coupons in a manner permitting the coupon to be subsequently located for on-demand use at the point-of-sale terminal. Difficulties collecting and redeeming coupons are further emphasized when the coupon offers being collected have different terms of use or redemption, such as different expiration dates or valid periods for use.

SUMMARY OF THE INVENTION

One aspect of the present invention relates to a coupon system including a coupon identification code, a database, and a point-of sale terminal. The database stores at least a portion of the coupon identification code linked to a plurality of offers for commercial advantage. The point-of-sale terminal is in communication with the database. During use, the coupon identification code is entered into the point-of-sale terminal, and the point-of-sale terminal is adapted to determine the plurality of offers linked to the coupon identification code and terms for redeeming one or more of the plurality of offers based at least in part on reference to the database such that the point-of-sale terminal discounts a current purchase based upon the terms for redeeming the one or more of the plurality of offers. Other related products and methods are also disclosed and provide additional advantages.

BRIEF DESCRIPTION OF THE DRAWINGS

Embodiments of the invention will be described with respect to the figures, in which like reference numerals designate like elements, and in which.

DETAILED DESCRIPTION

A coupon is provided for presenting a plurality of offers for commercial advantage to a consumer wherein each of the plurality of offers is associated with a single coupon identification code. In particular, unlike conventional paper coupons that are individually clipped, organized, and taken to the retail store, coupons according to embodiments described herein provide a system and method for the consumer to redeem a plurality of offers using one disposable coupon. By associating a plurality of offers with a single coupon identification code, a more efficient and convenient method of providing commercial incentives is provided.

Not only are such coupons more convenient for consumers, but the coupons described herein are more efficient due to the single identification code that is scanned or otherwise entered at the point of sale. Accordingly, the time spent at the point of sale to complete a single purchase transaction is decreased for the consumer and the retail setting. Decreasing the overall time each consumer spends in the checkout line or in completing a purchasing transaction provides a more attractive shopping environment and experience, increases overall efficiency of the retail establishment, decreases the labor necessary to handle consumer purchases, and improves the bottom line of retailers from which products are purchased. In addition, in one embodiment, the coupons can be entered at the point of sale at any time during the transaction rather than only at the end of the transaction as is typical for conventional coupons. The flexibility of when the coupons described herein are entered during the transaction provides additional attributes of convenience.

Furthermore, according to embodiments described herein, database marketing can be incorporated to generate multiple offer coupons customized to particular consumers based upon their purchase history, demographics, and/or other pertinent factors. Since the offers presented to the one or more consumers are based on prior information about the consumer, the likelihood that a coupon will be redeemed is increased. Increased coupon redemption is typically desired as it generally corresponds to an increase in the number of products sold to consumers. As a result, the effectiveness of the marketing initiative associated with a multiple offer coupon is enhanced.

Figure 1:
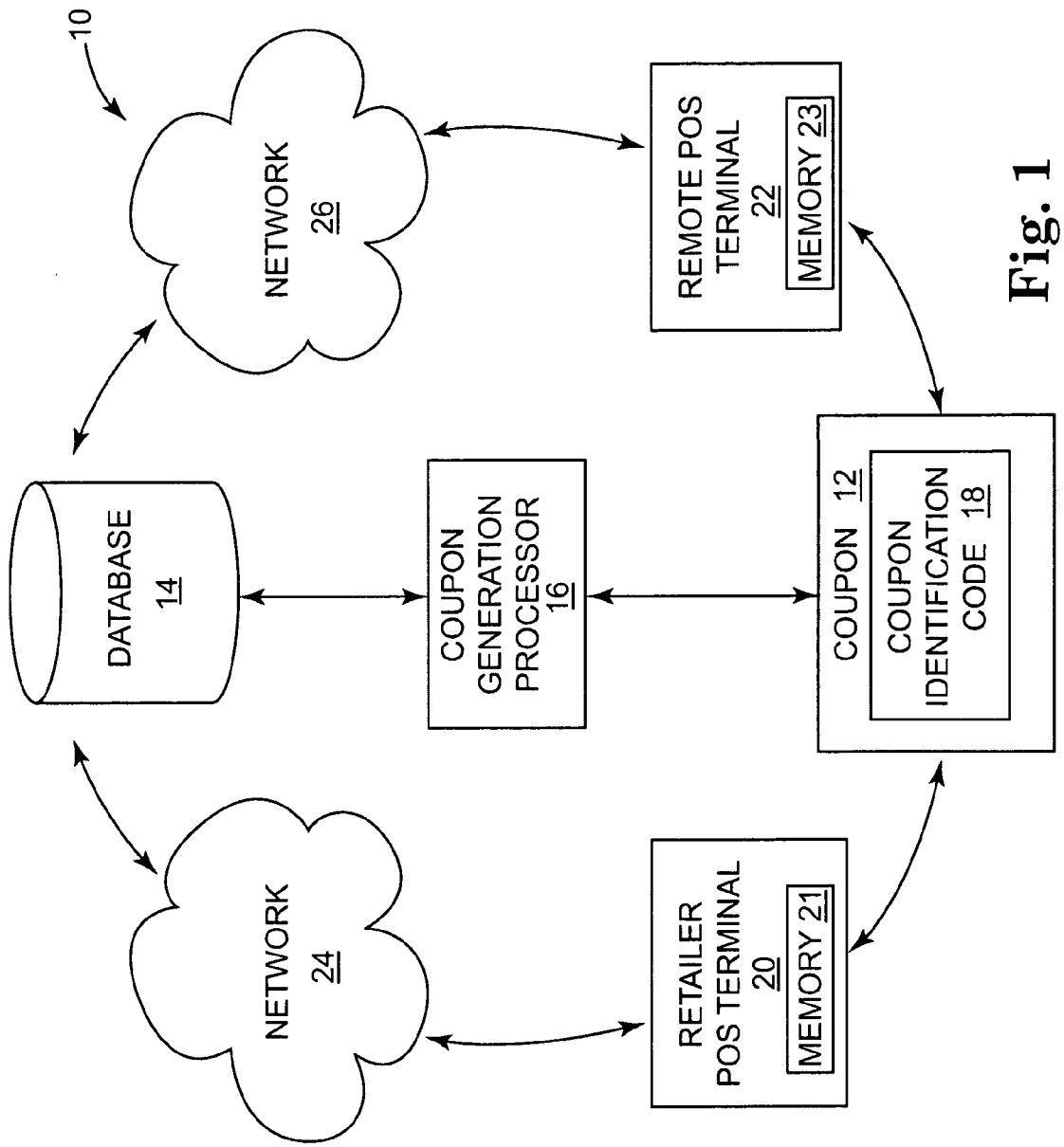
FIG. 1 is flow chart generally illustrating a coupon system, according to the present invention.

Turning to the figures, FIG. 1 illustrates one embodiment of a coupon system 10 configured to provide for generation and redemption of coupons 12 presenting multiple promotional offers for commercial advantage. Coupon system 10 includes a database 14 and a coupon generation processor 16. Database 14 is configured to store information that can be used to generate coupons 12 containing multiple offers that are targeted to particular consumers. It should be understood that database 14 may be a single database or any suitable collection or arrangement of databases or memory storage. Coupon generation processor 16 is in communication with database 14 and is configured to process information stored in database 14 to generate particular multiple offer coupons 12 as desired.

Each coupon 12 generated by coupon generation processor 16 generally includes a plurality of offers for commercial advantage. Coupon 12 may be any linked to any suitable promotion or other presentation and includes details regarding a plurality of offers for commercial advantage. In one embodiment, in order to facilitate redemption of the offers, coupon 12 includes or is otherwise associated with a corresponding coupon identification code 18. Coupon identification code 18 is stored in database 14 and is linked to the particular details of the offers, etc. associated with a particular coupon 12. As such, coupon identification code 18 is one example of means for linking each of the plurality of offers to a single coupon identification code Generated coupons 12 are distributed to consumers and can subsequently be redeemed at either a retailer point-of-sale (POS) terminal 20 or a remote point-of-sale (POS) terminal 22. In one embodiment, POS terminals 20 and 22 are in communication with database 14 via network 24 and network 26, respectively. In one example, each POS terminal 20 and 22 includes a memory or other database 21 and 23, respectively, that can be used among other things to store the details of available offers. Accordingly, each POS terminal 20 and 22 is configured to use coupon identification code 18 to identify offers associated with coupon 12 and to access details of the identified offers stored in database 14 and/or the respective memory 21 or 23. Using the offer details, each terminal 20 and 22 is configured to accept and redeem the offers associated with coupon 12 and, thereby, to award the consumer with a commercial advantage on a purchase being made at the corresponding POS terminal 20 or 22.

POS terminals 20 and 22 are each any cash register, kiosk, self-service check-out station, personal computer, or any other suitable terminal including a computer processing unit configured to process consumer purchases for retail sale transaction. In one embodiment, retailer POS terminal 20 is located at the retail setting and is configured to process a purchases for sale to a consumer. In one embodiment, remote POS terminal 22 is remotely located from the retail setting and is configured to allow consumer interaction with a retailer website (not shown) to make one or more purchases. In one embodiment, one of retailer POS terminal 20 and remote POS terminal 22 is not present.

The term "network" as used herein includes an intranet communication link, an Internet communication link, or similar communication link. In one embodiment, networks 24 and/or 26 include an Internet communication link providing access to the worldwide web. In one embodiment, where database 14 is maintained by the retailer associated with retailer POS terminal 20, network 24 may be an intranet network or private network available only to one or more retail settings associated with the overall retailer and not generally available to the public. In this manner, network 24 allows for remote communication between retailer POS and terminal 20 and database 14.

In one embodiment, remote POS terminal 22 is a personal computer located at the consumer's home or other location wherein the consumer is able to view a retailer website or to otherwise remotely communicate with a retailer via network 26. In this respect, in one embodiment, network 26 includes the Internet, and introduction of coupon identification code 18 to remote POS terminal 22 allows a consumer purchasing goods or services from the retailer website to redeem offers associated with corresponding coupon 12 via network 26 as outlined in the offer details stored in database 14. It should be noted that while networks 24 and 26 are illustrated and primarily described as being discrete networks 24 and 26, in one embodiment, networks 24 and 26 are the same network or have at least one communication link in common.

Figure 2:
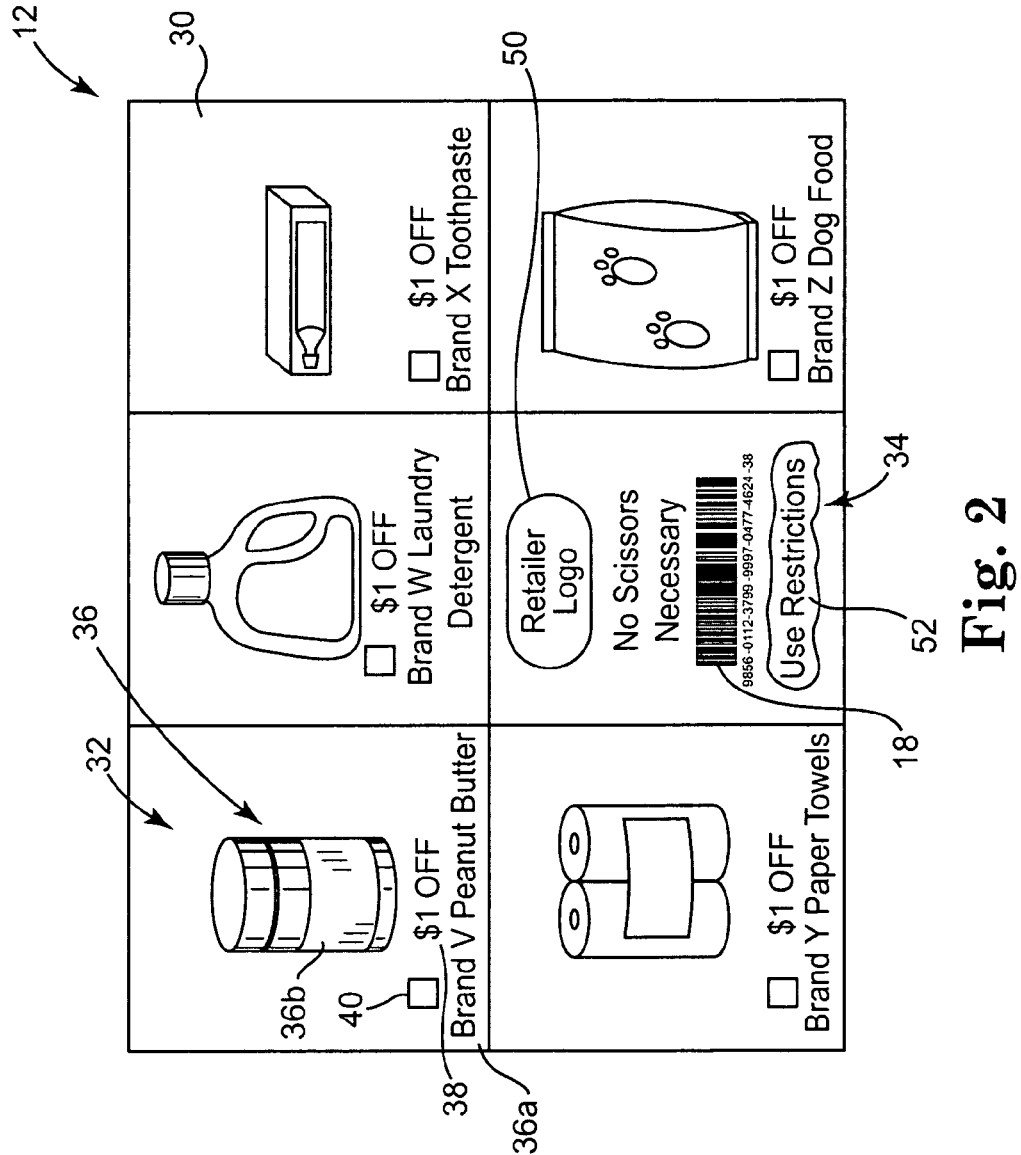
FIG. 2 is a front view illustration of one embodiment of a multiple offer coupon, according to the present invention.

One embodiment of coupon 12 is more specifically illustrated in FIG. 2. In one example, coupon 12 is printed on or otherwise affixed to sheet-like media 30, such as paper, paper board, plastic, or other suitable base substrate. In one embodiment, coupon 12 is in an electronic format delivered to a consumer via email or on a retailer website and can be subsequently printed to media 30 or maintained in a solely electronic format. Coupon 12 may be distributed to a consumer in any variety of manners such as by direct mail, email, website display, point-of-sale displays, handouts, newspaper and magazine advertisements, printed matter on products such as a transaction receipt, circulated through direct retail sale, and other suitable distribution means.

Coupon 12 generally includes offer details 32 and a redemption portion 34. Offer details 32 indicate various specifics regarding individual offers being made with coupon 12. For instance, offer details 32 include product indicia 36 (generally indicated in FIG. 2) and discount indicia 38. In one embodiment, product indicia 36 identify what goods and/or services, if any, are associated with an offer. Product indicia 36 include a name and/or brand 36a of the product and/or a graphical depiction 36b of the product associated with the offer being presented where the product may be one or more of a good and a service offered for retail sale.

Discount indicia 38 include information about the type of commercial advantage being offered. For example, discount indicia 38 may indicate that the offer is for a dollar amount off of a product purchase price, for a percentage off the product purchase price, for a percentage off a total cost of a purchase, for a free product when another product is purchased, or for any other suitable commercial advantage. In one embodiment, product indicia 36 and/or discount indicia 38 are provided for each of the plurality of offers being made with coupon 12. In one embodiment, a check box 40 or other suitable demarcation is also included on coupon 12 to facilitate consumer tracking of which offers have been redeemed during purchasing transactions. As such, check box 40 is one example of means for manually tracking redemption of a plurality of offers for commercial advantage.

Redemption portion 34 includes information regarding and/or facilitating redemption of the offers presented with coupon 12. In one embodiment, redemption portion 34 includes retailer indicia 50 and use restriction indicia 52. Retailer indicia 50 indicate the name, logo, trademark, or other identifier of a retailer configured to accept and redeem coupon 12 and to provide a consumer with the offered commercial advantage. Use restriction indicia 52 inform a consumer of the terms of use of a particular coupon 12 or for individual offers provided by coupon 12. For example, restriction indicia 52 may include one or more of an expiration date, a period for use, a limitation on the quantity of items for which an offer may be applied, a limitation of the number of times an offer may be redeemed, a list of exclusions, instructions regarding how to redeem the offers of coupon 12, and any other suitable terms or limitations affecting use of coupon 12.

In one embodiment, redemption portion 34 includes coupon identification code 18 configured to be scanned, read, or otherwise entered into one or both of POS terminals 20 and 22 (FIG. 1). For example, coupon identification code 18 is one or more of a magnetic strip, a linear bar code (a bar code having data encoded in one direction), a multi-dimensional bar code (a bar code having data encoded in at least two directions), a radio frequency identification (RFID) device, a string of characters (e.g., numbers and/or letters), etc. Coupon identification code 18 is configured to link coupon 12 to a detailed description of the terms of the offers included therein stored in database 14 as will be further described below.

Figure 3:
FIG. 3 is a schematic illustration of one embodiment of a coupon identification code.

As illustrated in FIG. 3, in one embodiment, coupon identification code 18 is a bar code and includes information configured to facilitate processing of coupon 12. In one example, coupon identification code 18 includes a plurality of information identifiers including one or more of a bar code identifier 60, a coupon type identifier 62, an account identifier 64, a master offer identifier 66, and a check digit 68. In one example, coupon identification code 18 links coupon 12 to one or more offers, but does not include information regarding the details of such offers (i.e., identify products, discount amounts, or other offer terms). Bar code identifier 60 is configured to identify the origin of coupon 12, such as from the retailer, manufacturer, or other promoting entity.

Coupon type identifier 62 signifies that coupon 12 relates to multiple offers for discounts or other commercial advantages rather than a single product. In one embodiment, account identifier 64 is configured to provide a substantially unique identifier associated with each coupon 12 as compared with other similar multiple offer coupons. By providing each coupon 12 with a substantially unique account identifier 64, fraud in redeeming coupon 12 can be decreased. For example, in one embodiment, the substantially unique account identifier 64 may be used to prevent or decrease the redemption of copies, such as photocopies, of the originally rendered coupon 12. In addition, account identifier 64 generally facilitates tracking of coupon 12. For instance, in mass mailings each coupon 12 may be provided with a different account identifier 64 to facilitate tracking of which coupons 12 were redeemed, etc. or to otherwise differentiate each coupon 12 from other similar coupons.

In one example, account identifier 64 corresponds to a particular account stored in database 14 (or other storage module associated with coupon system 10) and is configured to facilitate tracking and use of coupon 12. In one embodiment, account identifier 64 corresponds to an account (for example, a consumer profile 74 or coupon designation 76 described below with respect to FIG. 4) associated with a consumer to whom coupon 12 was originally distributed. In this manner, each individual consumer corresponds with a different account identifier 64 or set of information corresponding to their particular consumer profile. Accordingly, usage of coupon 12 can be tracked to the account and, in some cases, to the consumer who originally received the promotion, and a retailer or provider of coupon 12 can evaluate the effectiveness of the distribution including coupon 12 by analyzing the rate of offer redemption. As such, account identifier 64 is one example of means for associating the plurality of offers with a consumer.

In one example, when account identifier 64 is linked with a consumer, account identifier 64 is only generally linked thereto. For instance, account identifier 64 may be associated with a financial instrument (such as a check, credit card, etc.) used and assumed to be associated with an unnamed consumer and, as such, in one embodiment, is not specifically linked to a named consumer. In one embodiment, account identifier 64 is merely a number or representation included to differentiate a first coupon 12 from a second similar coupon without being linked to an account stored by coupon system 10.

In one embodiment, master offer identifier 66 provides information regarding the particular offers being presented with coupon 12. More specifically, master offer identifier 66 corresponds with a portion of database 14 and/or memories 21 and/or 23 that defines the offers included with each coupon 12 and the terms of each corresponding offer. In one example, master offer identifier 66 provides information regarding a pool of offers wherein only a portion of the offers included in the pool are actually redeemable with coupon 12. Master offer identifier 66 generally includes only an address or other pointer to a portion of database 14 and/or memory 21 or 23 that includes the details of what offers are associated with coupon 12. In one embodiment, master offer identifier 66 and, in one example, coupon identification code 18 as a whole, are characterized as not including the terms of the corresponding offers such as the products or value of the commercial advantage being offered. Rather, the offer terms or details are only included in database 14 and/or POS terminal 20 and/or 22 and not in coupon identification code 18 itself. Check digit 68 is generated to permit checking that proper scanning of the remainder of coupon identification code 18 was completed.

In other embodiments, coupon identification code 18 includes other informational items and/or all the identifiers 60, 62, 64, 66, and 68 discussed above may not be included. Other alterations of the information included in coupon identification code 18 will be apparent to those of skill in the art upon reading this patent application.

Figure 4:
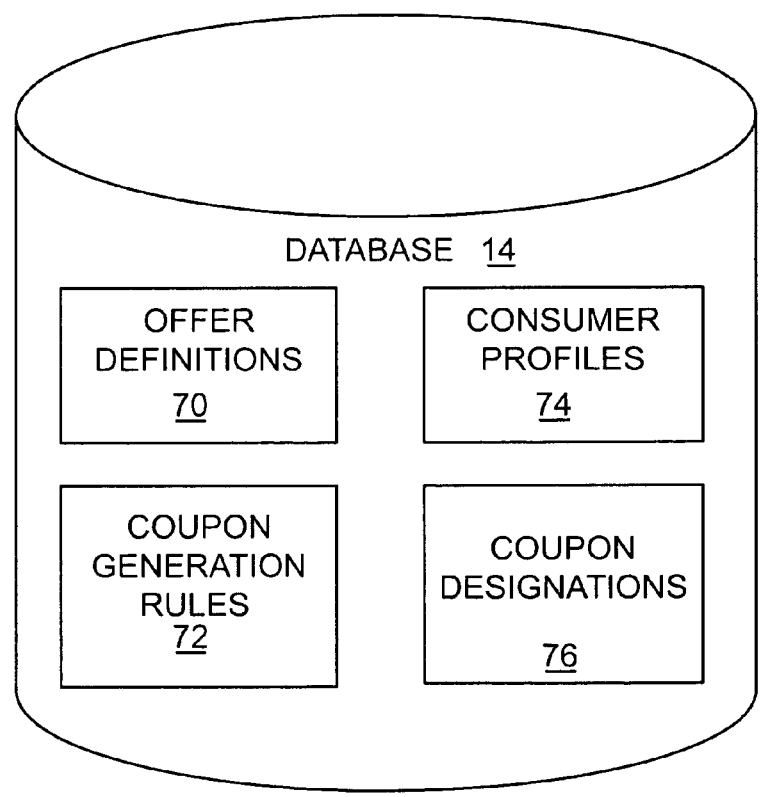
FIG. 4 is a schematic illustration of one embodiment of a database of the coupon system of FIG. 1.

Referring to FIG. 4, in one embodiment, database 14 includes information for generating and/or redeeming coupon 12. In one embodiment, database 14 includes offer definitions 70, coupon generation rules 72, consumer profiles 74, and coupon code destinations 76. Offer definitions 70 include details regarding each individual offer that may potentially be presented to a consumer. In particular, offer definitions 70 may include information such as a type of offer, a product that an offer relates to, a value of the offer, and/or any restrictions associated with the offer. For example, an offer A (not shown) may be defined in offer definitions 70 as pertaining to a dollar-off discount of brand V peanut butter and may be defined as being available until a particular expiration date. Other details regarding offers may also be included, such as product size definitions, quantity restrictions, etc. In this manner, offer definitions 70 include details regarding any number of offers available for presentation to consumers. In one embodiment, offer definitions 70 are additionally or alternatively stored to POS terminals 20 and/or 22, more specifically, to memory 21 and/or memory 23 (FIG. 1) respectively included therein, or to another database (not shown) in communication with POS terminals 20 and/or 22.

Coupon generation rules 72 provide general rules for determining which offers defined in offer definitions 70 will be included in a generated coupon 12 (FIG. 2). In this manner, coupon generation rules 72 may be provided for any one of a variety of promotional purposes. For example, coupon generation rules 72 may include rules for providing coupons to new consumers, to seasoned consumers, to consumer who regularly purchase a predefined type of product from the retailer, to consumers of a particular area, to promote a new product, to promote a new media release, to promote a sale, etc. It should be understood that, in one example, coupon generation rules 72 can be modified, new rules added, and/or old rules deleted by a system programmer as desired to achieve a particular promotional goal.

In one embodiment, where coupon generation rules 72 include one or more rules for selecting offers based on the historical purchasing behavior of a consumer, database 14 additionally includes consumer profiles 74 or other accounts. Consumer profiles 74 of database 14 include a plurality of consumer profiles each identifying a particular consumer and information about the identified consumer. For instance, a consumer profile 74 may include purchasing history, demographics, or other suitable information relating to a consumer that is useful in selecting offers for presentation to that consumer. In one instance, the consumer may be identified by any one or more of a consumer name, a consumer address, a consumer financial account, a consumer log-in for or an account with a retailer website or other website, etc.

For example, where a consumer is identified based on a consumer financial account (i.e., a credit card account number, a checking account number, etc.), all purchases made with a particular credit card account number, checking account number, or other account identifying factor may be used to group such purchases together to define one consumer profile 74. Consumer profiles 74 may also include demographic information, consumer purchasing tendencies, prior coupon redemption history for the consumer, and any other suitable information for database marketing. Other manners of forming and defining consumer profiles will be apparent to those of skill in the art upon reading this patent application.

In one embodiment, coupon generation rules 72 may include a rule configured to select specific offers from offer definitions 70 based specifically upon details of one or more consumer profiles 74. For example, a consumer who previously purchased a particular product may be more likely to redeem offers relating to, associated with, or competing with the particular product since the consumer is already known to purchase such products. In other examples, coupon generation rules 72 may be configured to select offers relating to products that a consumer has not purchased at the retailer before to encourage a consumer to start purchasing such types of products at the retailer. In this manner, coupon generation rules 72 may include any protocol configured to specifically select offers that a particular consumer is deemed more likely to redeem based on past or current purchasing behavior to achieve a desired promotional result such as to encourage a continuation of past purchasing behavior, an alteration in future purchasing behavior, etc.

In one embodiment, coupon generation rules 72 additionally or alternatively define triggering events that initiate coupon generation. For example, a consumer viewing or otherwise selecting a particular web page, item, etc. on a website such as the retailer's website is defined as a triggering event causing coupon generation processor 16 to generate coupon 12 for delivery to the consumer via the website, etc. In one embodiment, coupon 12 includes a group of offers customized to a specific individual consumer or a specific group of consumers such that a first group of offers, which is included on a first coupon 12 and is associated with a first consumer or group of consumers, differs from a second group of offers, which is included on a second coupon 12 and is associated with a second consumer or group of consumers (see, e.g., the different offers associated with different coupon identification codes 18a, 18b and 18c in FIG. 5). However, coupon generation rules 72 can be defined to achieve an intermediate level of customization or no customization as will be apparent to those skilled in the art.

Additionally referring to FIG. 1, coupon generation processor 16 is any processor or suitable system configured to parse offer definitions 70, coupon generation rules 72, and/or consumer profiles 74 to define a coupon 12. Once the details for a particular coupon 12 are selected, a coupon identification code 18 is assigned to coupon 12 and links coupon 12 to the offers selected for coupon 12. More specifically, in one embodiment, the offer, or at least an identifier thereof, is linked to the assigned coupon identification code 18 as part of a coupon designation 76 stored in database 14 and/or memory 21 and/or 23.

Figure 5:
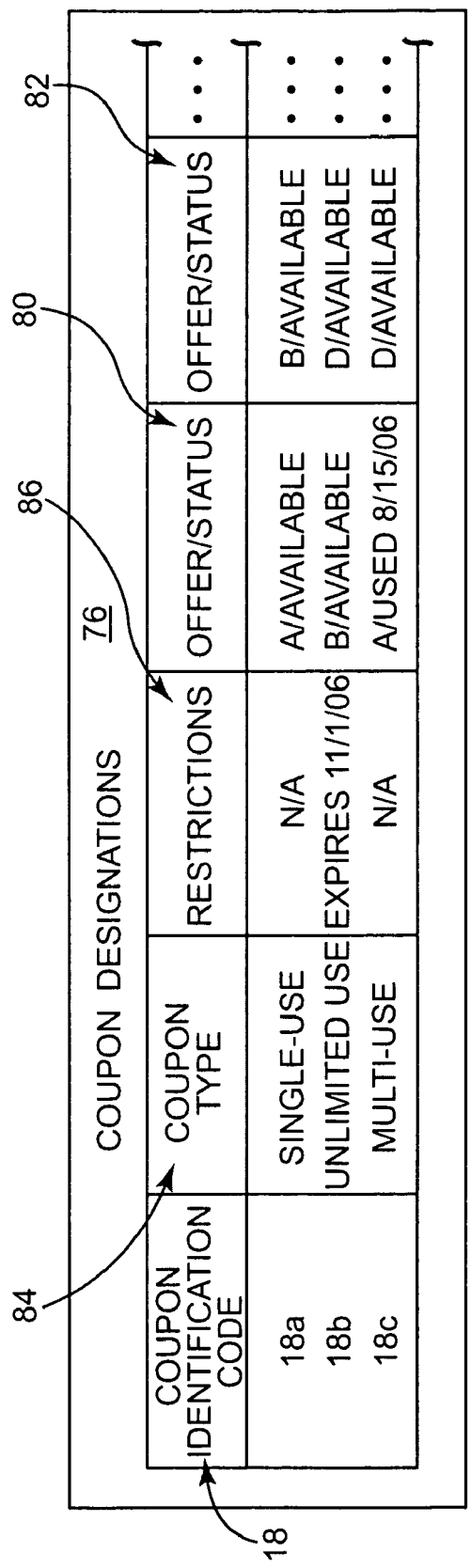
FIG. 5 is a schematic illustration of one embodiment of coupon designations stored in the database of FIG. 4.

FIG. 5 schematically illustrates records stored as coupon designations 76. Where a coupon generation processor 16 determines that a coupon 12 with a coupon identification code 18 of "18a" should include "Offer A," "Offer B," etc. such offer information 80 and 82 is recorded. In one embodiment, offer information 80 and 82 further includes a status, in particular, whether an offer is available for redemption, has been used, or is otherwise unavailable for redemption for each offer associated with coupon 12 having coupon identification code "18a." Other information specific to each coupon 12 may also be included in coupon designations 76. In one example, coupon designations 76 may identify the name or other identifier of the offers associated with coupon 12 as offer information 80 and 82, but do not generally include details regarding the terms of each offer. For example, coupon designations may include that "Offer A" and "Offer B" are associated with coupon 12 without designating a particular product, discount amount, expiration date, or other terms of "Offer A" and "Offer B."

In one embodiment, the type 84 of coupon provided may also be included where various types of coupons may be defined. In one embodiment, all offers provided in a particular coupon 12 are of a single type. For example, types of coupons 12 include multi-use coupons, single-use coupons, unlimited-use coupons, etc. Multi-use coupons refer to promotional mechanisms in which coupon 12 can be used during multiple purchase transactions, but where each offer included thereon is available for a single, one-time use. For example, where coupon 12 includes an first offer, such as an offer for one dollar off a purchase price of brand V peanut butter, and a second offer, such as an offer for one dollar off a purchase price of brand W laundry detergent, each of the first offer and the second offer can only be used once even though coupon 12 can be used during multiple purchase transactions. As such, coupon 12 can be used in two separate purchase transactions where the first offer is redeemed on one of the purchase transactions and the second offer is redeemed on a different one of the purchase transactions. First and second offers can also be redeemed on a single transaction so long as each of first and second offers is only redeemed one time.

Single use coupons refer to promotional mechanisms that can only be used during a single purchase transaction. For example, where coupon 12 includes a first offer and a different second offer, use of coupon 12 in one purchase transaction prevents use of coupon 12 in any subsequent purchase transactions. The one-time use of coupon 12 is true for all offers associated therewith. For instance, if during a purchase transaction only the first offer is redeemed, all offers including the second offer associated with coupon 12 are voided for use in future purchase transactions.

Unlimited use coupons refer to promotional mechanisms that can be used during multiple purchase transactions and each offer within the coupon can also be used during multiple purchase transactions. Unlimited use coupons or any other type of coupon may include an expiration date or other quantity of use expiration such that at some point the promotional mechanism can no longer be redeemed. Such expiration date or other use restrictions, where applicable, are generally recorded as restrictions 86 in coupon designations 76. For example, where coupon 12 (FIG. 2) includes three distinct offers such as an offer for one dollar off a purchase price of brand V peanut butter, one dollar off a purchase price of brand W laundry detergent, and one dollar off a purchase price of brand X toothpaste, each offer can be redeemed during any number of purchase transactions until that coupon 12 expires on a particular date indicated in use restrictions 40 (FIG. 2).

Other offer types configured to achieve a promotional goal for the retail setting may be used as will be apparent to those of ordinary skill in the art upon reading this application. For example, particular offers within a single coupon may expire or be available on different days in order to encourage a consumer to visit a retail setting on a particular day or more than one particular day as desired (i.e. multiple phase coupons). In one example, a multi-use coupon is provided where each offer is available for a predetermined number of times (i.e., a first offer can be redeemed twice and a second offer can be separately redeemed three times) and can be used on a number of transactions. In addition, each coupon designation 76 may include a particular mode of distribution or specifics regarding the format of the corresponding coupon 12 to consumers. For example, coupons may be distributed via direct mail, email, websites, point-of-sale displays, hand-outs, newspaper and magazine advertisements, printed on other products, printed on transaction receipts, etc. Other information may be stored in database 14 in addition to or as an alternative to offer information 80 and 82 (such as offer identification and status), coupon type 84, and/or coupon restrictions 86 as will be apparent to those of skill in the art.

In one embodiment, coupon designations 76 also identify a particular format or configuration of coupon 12. For example, coupons may be generated in a variety of formats including that illustrated in FIG. 2 for coupon 12. For instance, coupons may be provided in a format similar to that illustrated and described for coupon 112 in FIG. 6, coupon 212 in FIG. 8, coupon 312 in FIG. 9, and other suitable coupon configurations. Each of coupons 112, 212, and 312 are similar to coupon 12 as described above and as will primarily be referred to below except for the differences explicitly enumerated herein. It should be understood, that in general, each of coupons 12, 112, 212, and 312 can be substituted for each other, such as in the description of the methods of FIGS. 10 and 12 primarily described below with respect to coupon 12.

Figure 6:
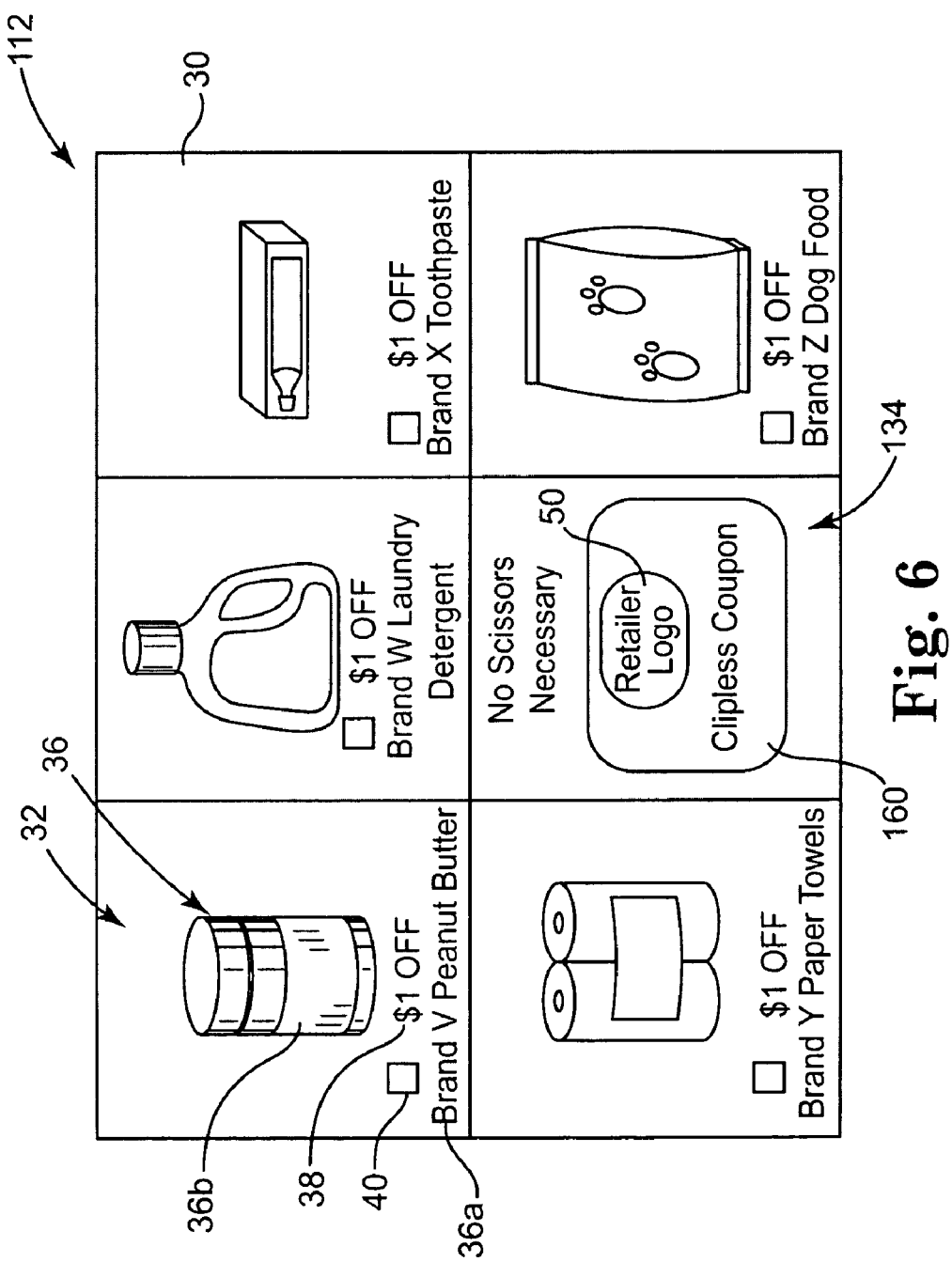
FIG. 6 is a front view illustration of one embodiment of a multiple offer coupon, according to the present invention.
Figure 7:
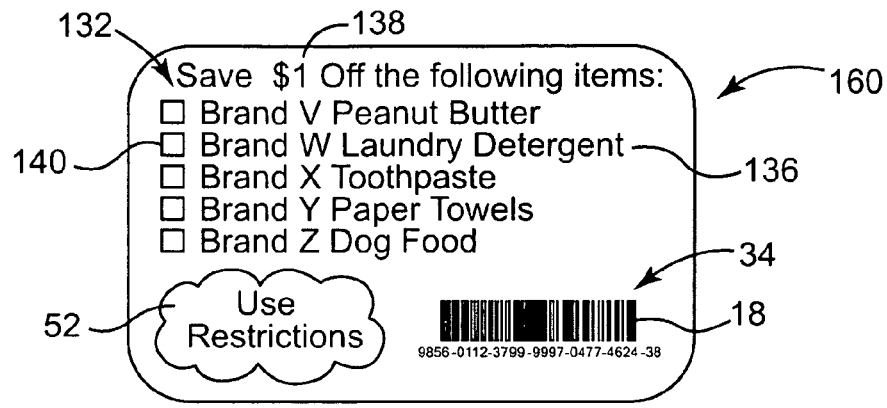
FIG. 7 is a rear view illustration of a coupon card of FIG. 6, according to the present invention.

More specifically, referring to FIG. 6, in coupon 112, a redemption portion 134 is substituted for redemption portion 34 of coupon 12 of FIG. 2. Redemption portion 134 includes information regarding redemption of coupon 112 or at least a portion thereof. In one embodiment, redemption portion 34 includes a coupon card 160 removably coupled with sheet media 30 of coupon 112, for example, such that coupon card 160 is bordered on at least two sides by sheet media 30 as shown in FIG. 6. In one embodiment, coupon card 160 is sized similarly to a credit card or common currency such that coupon card 160 is configured to easily fit within a wallet of a consumer to facilitate availability of coupon card 160 during purchase transactions. With additional reference to the rear view illustration of coupon card 160 in FIG. 7, in one embodiment, coupon card 160 includes coupon identification code 18 and one or more of offer details 132, check boxes 140, retailer indicia 50, and use restriction indicia 52.

In one embodiment, additional offer details 132 include additional product indicia 136 and discount indicia 138. In one example, due in part to the limited space provided on coupon card 160, additional product indicia 136 and discount indicia 138, which are similar to product indicia 36 and discount indicia 38, are provided in an abbreviated format as compared to the format illustrated in FIG. 6 for product indicia 36 and discount indicia 38. For example, discount indicia 138 may be generalized to apply to all offers associated with coupon 112 and/or product indicia 136 may list the items included in the offers without graphical or other large representations of the products associated with the offers of coupon 112.

Since coupon card 160 includes coupon identification code 18, while coupon 112 as a whole can be distributed to consumers for promotional purposes, only coupon card 160 can be removed from media 30, stored, transported, and presented at POS terminal 20 and/or 22 to redeem the associated offers. Accordingly, the bulk of coupon 112 (i.e., media 30) need not be stored and transported, which further increases consumer convenience. In this manner, product indicia 136, discount indicia 138, and check boxes 140, if any, aid a consumer in tracking what offers relate to coupon card 160, which offers have been used, which offers are still available, etc.

Figure 8:
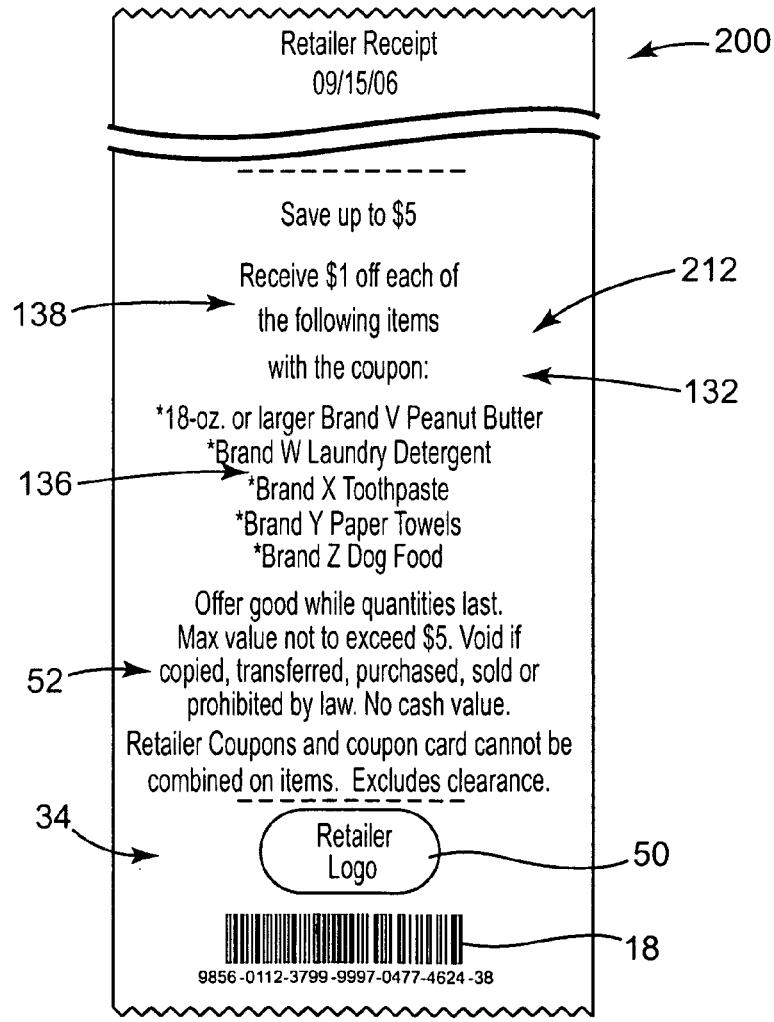
FIG. 8 is a front view illustration of one embodiment of a multiple offer coupon included on a sales receipt, according to the present invention.

Coupon 212 illustrated in FIG. 8 is printed as part of a receipt 200 provided at retailer POS terminal 20 (FIG. 1) following completion of a purchase transaction. Coupon 212 is printed to include one or more of redemption portion 34 with coupon identification code 18, product indicia 136, discount indicia 138, check boxes 40, retailer indicia 50, and use restriction indicia 52. As such, coupon 212 can be used similarly to coupon 12 described above.

Figure 9:
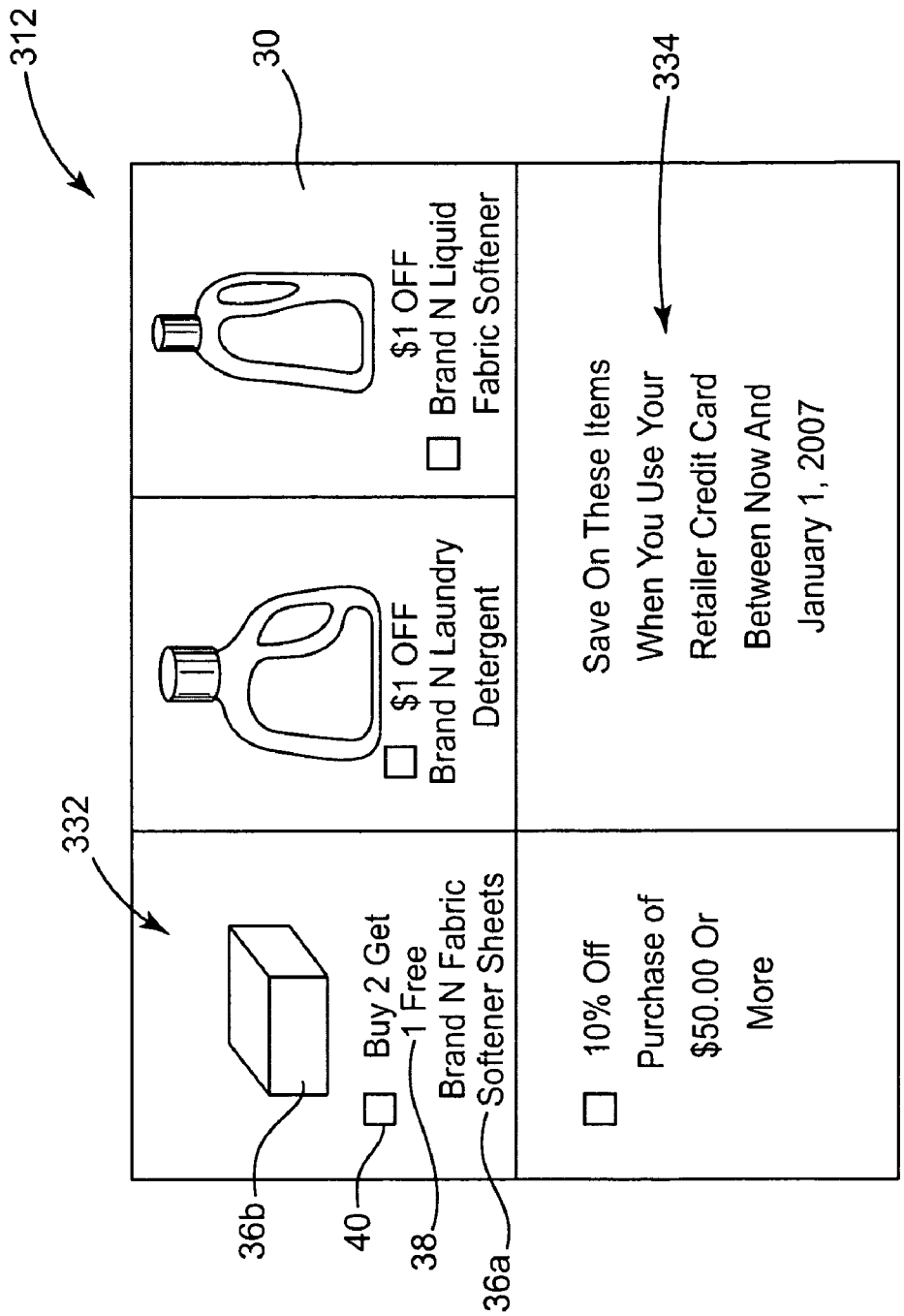
FIG. 9 is a front view illustration of one embodiment of a multiple offer coupon, according to the present invention.

Coupon 312 illustrated in FIG. 9 is printed to or otherwise appears on substrate 30 or is electronically presented to a consumer, for example, via email or when a consumer is viewing a retailer's website. Coupon 312 includes offer details 332 and redemption portion 334. Offer details 332 are similar to offer details 32 described with respect to coupon 12 (FIG. 2), but one or more of the offers indicated by offer details 332 relates to a different type of offer. Furthermore, the offers of coupon 312 are illustrated as all relating to a similar brand to illustrate a method of promoting purchase of products related to products previously purchased by a consumer. For example, where a consumer previously purchased brand N fabric sheets, the offers of coupon 312 may relate to other the brand N products, for example, brand N laundry detergent and liquid fabric softener, to encourage consumer brand loyalty as indicated by offer details 332. Offer details 32, 132, and 332 can readily be substituted for one another.

Coupon 312 also includes redemption portion 334. Redemption portion 334 differs from redemption portion 34 of coupon 12 and redemption portion 134 of coupon 112 as it does not include coupon identification code 18 (FIG. 2). Rather, coupon 312 includes instructions for redemption, namely that the offers indicated by offer details 332 are automatically redeemable by using a retailer credit card (i.e., a credit card associated with the redeeming retailer) to purchase the indicated products or to otherwise make a purchase eligible for an offer (e.g., to make a purchase of sufficient size such as for $50 or more to receive ten percent off the purchase).

In one embodiment, coupon designations 76 stored in database 14 (FIG. 1) are stored as part of a financial account or record associated with the retailer credit card such that, upon use of the retailer credit card, POS terminal 20 or 22 (FIG. 1) accessing database 14 is instructed to apply each offer indicated by coupon 12 where applicable. In this manner, a consumer need not present any additional information at POS terminal 20 or 22 (FIG. 1) to redeem an offer, other than the retailer credit card, to pay for any purchases made. Other suitable formats and associated methods of linking a multiple offer coupon with a financial account or record (e.g., a retailer credit card) may alternatively or additionally utilized. Other types and formats of coupons 12, 112, 212, and 312 are also contemplated.

Figure 10:
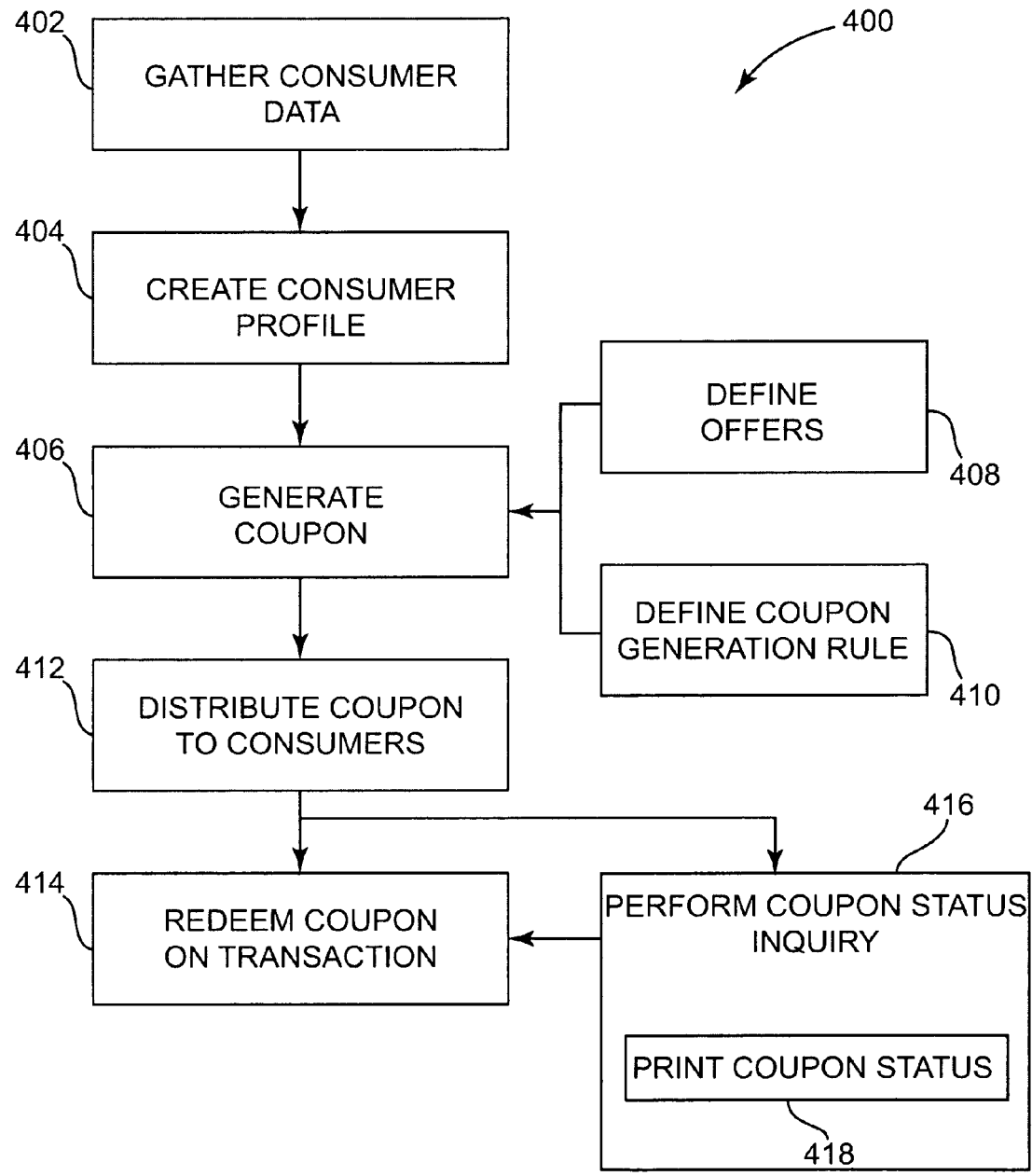
FIG. 10 is a flow chart illustrating a method of generating and redeeming a multiple offer coupon, according to the present invention.

FIG. 10 is a flow chart generally illustrating one embodiment of a method for generating and redeeming a multiple offer coupon generally at 400 and is described with additional reference to FIG. 1. Method 400 includes gathering consumer data at 402. Consumer data can be gathered at 402 in any suitable manner, such as per known purchase behavior modeling techniques. For instance, consumer purchases made at a particular retailer such as by POS terminal 20 or 22 can be systematically stored to database 14 as consumer profiles 74 (FIG. 4) based on a linking account identifier such as a financial account number, etc. as described above. In this manner, at 404, consumer data including the purchases commonly made by a consumer, the monetary purchase volume of a consumer, the frequency of purchases made by a consumer, etc. for a particular consumer (or at least with a financial account associated with a particular consumer) is gathered, tabulated, and/or otherwise tracked and stored to database 14 to create a consumer profile 404.

At 406, coupon 12 is generated. In particular, in one example, prior to generating coupon 12, at 408, individual offers are defined and stored as offer definitions 70 (FIG. 4) to database 14 and/or memory 21 and/or 23. As described above, individual offers may be defined to offer any commercial advantage linked to a product for purchase or other purchase identifying factor. At 410, a coupon generation rule 72 (FIG. 4), which provides instructions for selecting offers for association with a coupon to be generated, is defined and stored to database 14. As described above, coupon generation rules may be defined by a system programmer to achieve any promotional purpose (e.g., to promote repeat purchases, to encourage product loyalty, to promote purchases in related departments, etc.) as will be apparent to those of skill in the art.

As such, in one embodiment, generating a coupon at 406 includes coupon generation processor 16 executing the coupon generation rule 72 (FIG. 4) defined at 410 using consumer profile 74 (FIG. 4) as defined at 404 to select a group of two or more offers, which were defined at 408, for inclusion with coupon 12. In one example, generating a coupon at 406 includes generating a coupon 12 customized for a particular consumer. In one example, generating a coupon 406 includes generating a coupon 12 configured to be sent to a group of similar consumers. In one embodiment, operations 402 and 404 are eliminated and coupon 12 is generated at 406 without reference to a consumer profile or other account.

At 412, the generated coupons 12 are distributed to corresponding consumers (i.e. the consumers corresponding to consumer profile 74 used to generate coupon 12). Coupons 12 may be distributed through any one or more of a variety of means for distributing such as direct mail, email, websites, point-of-sale displays, handouts, newspaper and magazine advertisements, printed matter on products such as cash register receipts, circulated through direct retail sale, etc. More specifically, in one example, coupons 12 are printed to substrate 30 and physically distributed to consumers. In one example, coupons 12 are electronically generated and are electronically delivered to consumers via email or one or more websites. In one embodiment, whether coupons 12 are physically or electronically delivered to consumers, each coupon 12 has a coupon identification code 18 customized to the corresponding consumer(s) or, more particularly, a new or existing consumer profile 74 associated therewith.

At 414, the consumer presents coupon 12 at one of POS terminals 20 and 22. The retailer via POS terminal 20 or 22 redeems at least one of the offers presented by coupon 12 on the purchase where applicable. For example, if a consumer is purchasing brand V peanut butter and the consumer electronically or manually presents coupon 12 at POS terminal 20 or 22 during the purchase transaction, one dollar will be deducted from one of the price of the peanut butter or the total purchase cost, provided the offer relating to brand V peanut butter is still available for redemption as defined by database 14. The method of redeeming coupon 12 on a transaction will be further described below with respect to FIG. 12.

At 416, a consumer optionally may request a coupon status inquiry be performed by POS terminal 20 or 22 redeeming the coupon at 414 or at any other POS terminal 20 or 22. Coupon identification code 18 is input into POS terminal 20 or 22, and POS terminal subsequently communicates with database 14 to access coupon designations 76, more specifically offer information 80 and 82 including the offer identification and status. As such, the consumer can be updated as to the current status of offers related to coupon 12, in particular, as to when offers were redeemed, what offers are still available, etc. In one embodiment, performing a coupon status inquire at 416 includes printing the current status of coupon 12 at 418. A status inquiry 416 can be performed before and/or after coupon 12 is redeemed on a transaction at 414.

Figure 11:
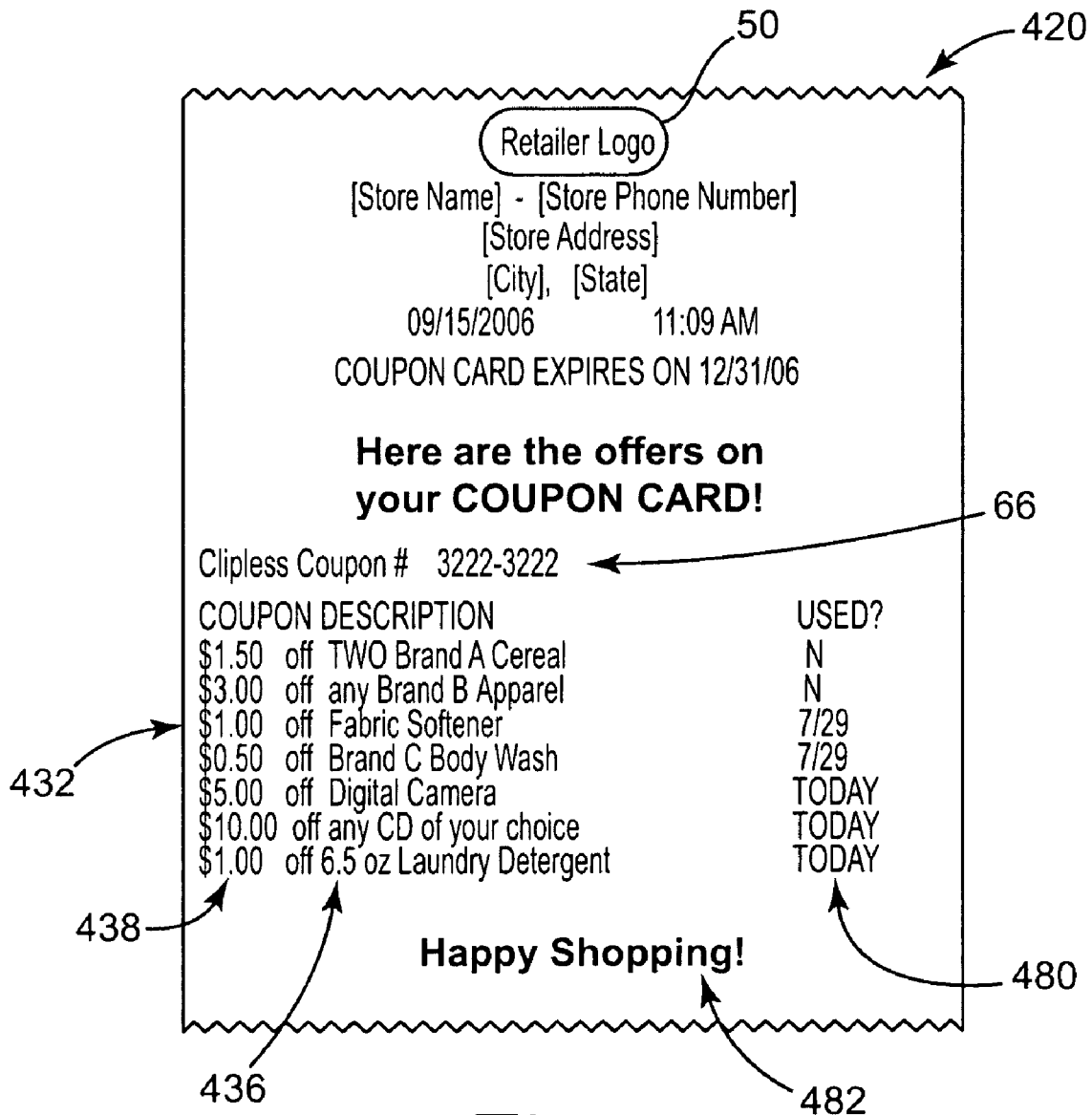
FIG. 11 is a front view illustration of one embodiment of a status printout printed during the method of FIG. 10.

One embodiment of a status printout 420 printed at 418 is generally illustrated in FIG. 11. In one example, status printout 420 includes similar fields as printed on coupon 12, such as at least a portion of coupon identification code 18 such as master offer code 66 and retailer indicia 50. In addition, status printout 420 includes one or more of offer details 432 including product indicia 436, discount indicia 438, and a status 480 for each of the offers. Similar to product indicia 36 (FIG. 2), product indicia 436 identify which products, if any, correspond with the offers associated with coupon 12. Similar to discount indicia 38 (FIG. 2), discount indicia 438 identify the value of the offer.

Status 480 indicates at least one of whether an offer is still available, whether an offer has expired, whether an offer has been used, a date the offer expired, a date the offer was used, and other pertinent information. In this manner the consumer is informed of which, if any, of the offers relating to coupon 12 remain available for future use. Accordingly, the consumer is reminded of remaining offers, which thereby encourages a consumer to use the remaining offers for a subsequent purchase. Additional indicia such as indicia 482, etc. may also be included on status printout 420 to promote coupon use, to entertain consumer, and/or for any other purpose. In one embodiment, all or part of coupon 12 is disposable following completion of method 400 for generating and redeeming multiple offer coupon 12.

Figure 12:
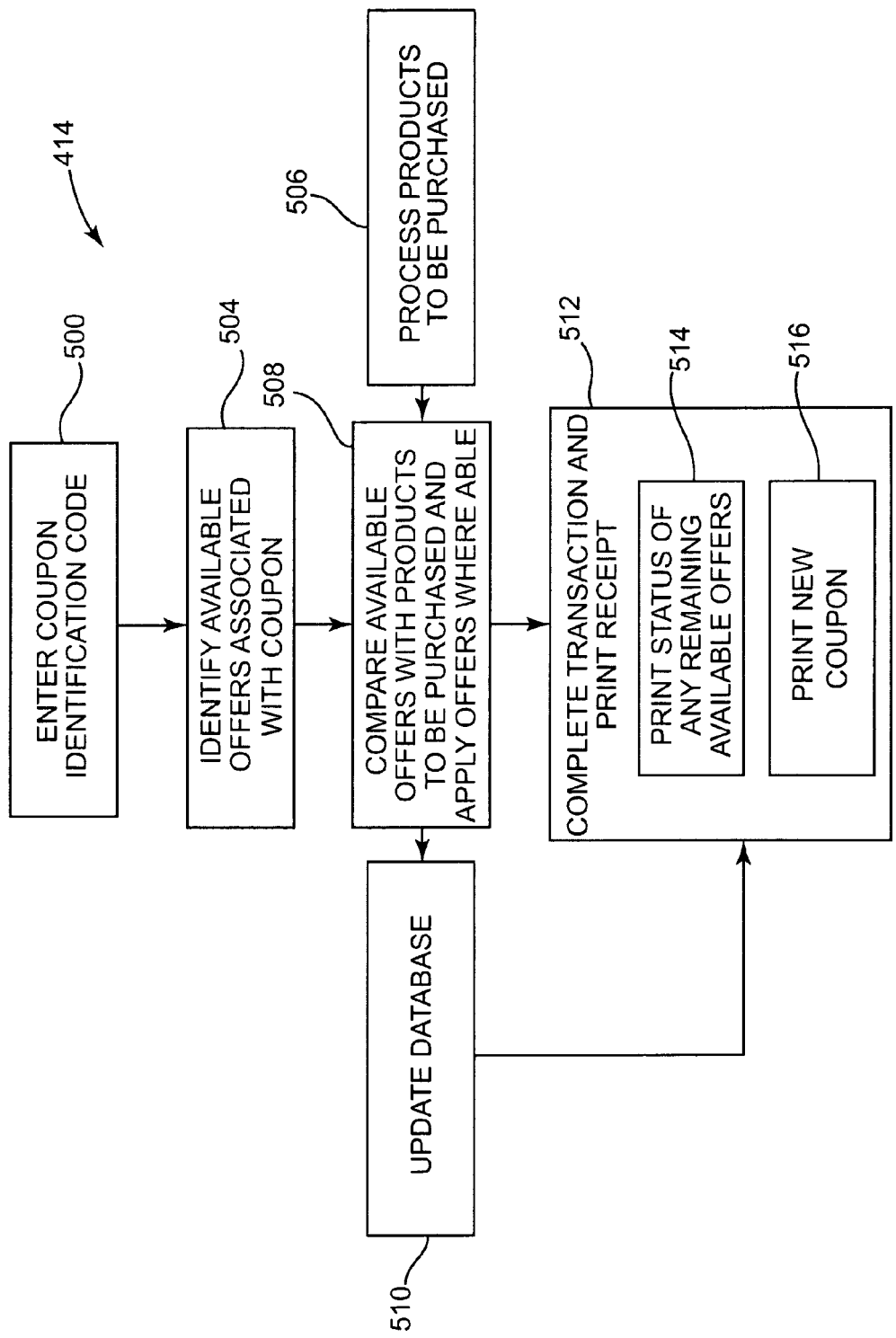
FIG. 12 is a flow chart illustrating one embodiment of a method of redeeming a multiple offer coupon as part of the method of FIG. 10.

FIG. 12 more specifically illustrates one embodiment of a method for redeeming a coupon at 414, which was previously generally described with respect to FIG. 10. Method 414 is described with additional reference to system 10 of FIG. 1. Method 414 includes entering coupon identification code 18 into POS terminal 20 or 22 at operation 500. Coupon identification code 18 can be entered into POS terminal 20 or 22 by scanning (for example, RFID, bar code, or magnetic strip scanning), key pad entry, or other suitable means and, in one embodiment, can be entered at any point during the transaction (for example, prior to product processing, during product processing, or after product processing for sale). At 504, POS terminal 20 or 22 additionally or alternatively accesses coupon designations 76 (FIG. 4) to determine which offers are presented with coupon 12. The identified offers are then compared to offer definitions 70 stored in one or more of database 14, memory 21, and memory 23 to access the details regarding the terms of those offers. More specifically, at 504, POS terminal 20 and 22 determines which offers are presented with coupon 12 that are still available for use (i.e., have not expired, have not previously been used, etc. depending on the coupon type) as designated by coupon designations 76.

In addition, at 506, the products being purchased by the consumer are processed at POS terminal 20 or 22. Processing the products generally includes entering the product description/identification and the product price into POS terminal 20 or 22. Accordingly, at 508, the offers identified at 504 and the products processed at 506 are compared to determine if any of the identified offers can be applied to the purchase of the processed products. For example, if an identified offer is for a one dollar discount on brand X toothpaste, the process products are analyzed to determine if brand X toothpaste is being purchased. If brand X toothpaste is not being purchased, than the one dollar discount is not applied to the transaction. However, if brand X toothpaste is being purchased, then the one dollar discount is applied to the transaction. In one embodiment, operations 500 and 504 can be performed at any time relative to the operation of processing of the products to be purchased at 506. In particular, operations 500 and/or 504 can be at least partially completed during any one of before, during, or after operation 506.

At 510, following operation 508, database 14 is updated to indicate one or more of coupon use, redemption of an offer, to update an offer status, to update a consumer profile 74, to debit a financial account or record, to record a purchase, to link consumer profiles 74, etc. In one embodiment, use of coupon 12 is particularly useful in updating the past purchasing history of a consumer. More specifically, as described above, consumer profiles 74 are typically generated based on a number of a financial account previously used to make a purchase at a retail setting. Accordingly, if a single consumer uses multiple financial accounts, such as a first credit card, a second credit card, a checking account, etc., it is possible that multiple consumer profiles 74 (e.g., one of for each financial account) have been generated for a single consumer since there may be no indication that the multiple financial accounts are related.

However, where coupon 12 is distributed to the consumer based upon a first consumer profile (i.e., a first credit card) and coupon 12 is redeemed in a transaction using a financial account associated with a second consumer profile (i.e., a second credit card), coupon system 10, more particularly, database 14 is notified that both the first consumer profile and the second consumer profile relate to a single consumer. Upon such a determination, the two consumer profiles can be merged into one compound consumer profile or can be otherwise linked for future analysis. In this manner, a more complete representation of the purchasing behavior of the consumer can be generated by linking information from the once separate consumer profiles together.

At 512, the purchasing transaction is completed and a receipt is printed at POS terminal 20 or electronically transmitted to POS terminal 22. In one embodiment, in addition to providing a traditional purchase receipt at 512, coupon status printout 420 (FIG. 11) may automatically be printed at 514 while in other embodiments, coupon status printout 420 is printed upon explicit inquiry of the status of coupon 12. The status of the offers is determined based upon database updates entered at 510 and/or the prior recorded status of offers in database 14.

In one embodiment, printing the receipt at 512 additionally includes printing a new coupon, at 516, such as printing a new coupon 212 (FIG. 8) including a new coupon identification code 18 and corresponding to new offers. In one example, new coupon 212 includes offers generally not related to the offers presented with original coupon 12. For example, new coupon 212 may be offered during a transaction that renders original coupon 12 void (i.e. no more offers are available for redemption with coupon 12). In other examples, new coupon 212 is offered following transactions in which no coupon 12 was redeemed. New coupon 212 may be another multiple offer coupon or any other coupon generally associated with receipt marketing. In one embodiment, operations 514 and/or 516 are eliminated.

Although the invention has been described with respect to particular embodiments, such embodiments are meant for illustrative purposes only and should not be considered to limit the invention. Various alternatives and other modifications are within the scope of the invention and its various embodiments will be apparent to those of ordinary skill.

What is claimed is:

1. A method of coupon generation, delivery, and redemption, the method comprising:

using a coupon generation processor to generate a coupon including:
selecting offers from a plurality of possible offers for commercial advantage stored in a database, wherein selecting the offers is based on prior purchasing behavior of a customer at a retailer, wherein the coupon generation processor accesses an individual customer account stored in the database to determine the prior purchasing behavior of the customer, and the individual customer account is associated with the customer and a financial instrument previously used by the customer to make a purchase at the retailer,
generating a coupon identification code for the coupon, the coupon identification code including an account identifier linking the coupon identification code to the individual customer account, wherein the coupon identification code links the selected offers to the coupon, and
storing the coupon identification code to the database;
electronically delivering the coupon to the customer, the coupon including the coupon identification code;
processing the coupon at a point-of-sale terminal in communication with the database as part of a retail transaction, wherein processing the coupon includes:
entering the coupon identification code into the point-of-sale terminal,
using the coupon identification code entered into the point-of-sale terminal to identify the selected offers,
comparing available ones of the selected offers to one or more products being purchased via the point-of-sale terminal as part of the retail transaction,
using the point-of-sale terminal to apply a discount to a purchase price of any of the one or more products being purchased that correspond to available ones of the selected offers, and
accepting, at the point-of-sale terminal, a financial instrument provided during the retail transaction as payment for the one or more products being purchased; and
comparing the financial instrument provided during the retail transaction to the financial instrument associated with the individual customer account, and if the financial instrument provided during the retail transaction differs from the financial instrument associated with the individual customer account linked to the coupon identification code of the coupon provided during the retail transaction, linking the financial instrument provided during the retail transaction to the individual customer account stored in the database.

2. The method of claim 1, wherein the coupon identification code is a bar code.

3. The method of claim 1, wherein each of the financial instrument associated with the individual customer account and the financial instrument provided during the retail transaction is one of a credit card and a debit card.

4. The method of claim 1, further comprising:
determining if the financial instrument provided during the retail transaction is associated with a different customer account unassociated with the coupon identification code, and
if the financial instrument provided during the retail transaction is associated with the different customer account, merging the individual customer account linked to the coupon identification code with the different customer account.

5. The method of claim 1, wherein electronically delivering the coupon to the customer includes electronically delivering the coupon including a list of the selected offers.

6. The method of claim 1, wherein one or more of the selected offers is available for repeated use during multiple retail transactions.

7. The method of claim 1, wherein the coupon identification code is characterized by an absence of terms for redeeming each of the plurality of possible offers and includes a master offer identifier linking the coupon identification code to terms for redeeming each of the plurality of possible offers, the terms being stored by the database such that using the coupon identification code includes accessing the database to identify the selected or more offers.

8. The method of claim 7, wherein comparing available ones of the selected offers to the one or more products being purchased includes:
determining which ones of the selected offers are available based on the terms and records of prior use of the selected offers stored in the database.

9. The method of claim 1, wherein the selected offers corresponding to the coupon identification code are customized to the customer based on the prior purchasing behavior of the customer using the financial instrument associated with the individual customer account.

10. The method of claim 1, further comprising:
following processing the coupon at the point-of-sale terminal, delivering to the customer a list of ones of the selected offers that remain available for future use.

11. The method of claim 10, wherein delivering to the customer the list occurs while the customer is at the point-of-sale terminal for the retail transaction.

12. The method of claim 1, wherein entering the coupon identification code into the point-of-sale terminal includes scanning the coupon identification code from the coupon.

13. The method of claim 12, wherein the coupon identification code is a bar code.

14. The method of claim 1, wherein the coupon generation processor is operated by the retailer, the database is maintained by the retailer, and the retailer performs at least the following: using the coupon generation processor, electronically delivering the coupon, processing the coupon, and comparing the financial instrument provided during the retail transaction to the financial instrument associated with the individual customer account.

15. A method for offering and accepting financial discounts, the method comprising:

creating a consumer profile based on available consumer data including prior purchases made by a particular consumer, and storing the consumer profile to a database, wherein the consumer profile identifies one or more financial instruments known to have been used by the consumer during one or more previous purchase transactions;
defining a plurality of offers for financial discount in the database;
using a processor in communication with the database to select ones of the plurality of offers based at least in part on the consumer profile and prior purchases made by the particular consumer;
generating a bar code linked to selected ones of the plurality of offers, and storing the bar code to the database;
generating and electronically distributing a coupon including the bar code to a consumer;
redeeming at least one of the selected ones of the plurality of offers during a transaction for retail sale using a retailer terminal in communication with the database, wherein the redeeming includes using the retailer terminal to read the bar code and apply one or more of the selected ones of the plurality of offers to the transaction including:
accepting, at the retailer terminal, a financial instrument as payment for the one or more products being purchased, and
comparing the financial instrument provided during the transaction to the one or more financial instruments identified by the consumer profile, and if the financial instrument provided during the transaction fails to match an of the one or more financial instruments identified by the consumer profile, linking the financial instrument provided during the transaction to the consumer profile stored in the database;
performing a status inquiry of the database to determine an availability status of each of the selected ones of the plurality of offers at the retailer; and
communicating the availability status for at least a portion of the selected ones of the plurality of offers to the consumer by providing the consumer with a list of those of the selected ones of the plurality of offers that remain available for future use after one or more of the selected ones of the plurality of offers have been redeemed by the consumer.

16. The method of claim 15, wherein selecting ones of the plurality of offers is individually performed for each of a plurality of consumers such that each of the plurality of consumers receives an individualized coupon including a different plurality of offers than are included on the individualized coupon received by other ones of the plurality of consumers, and the particular consumer is one of the plurality of consumers.

17. The method of claim 15, wherein communicating the availability status includes printing the list using the retailer terminal and handing the list to the consumer at the retailer terminal while the consumer is at the retailer terminal to purchase one or more items as part of a transaction for retail sale.

18. The method of claim 15, wherein redeeming at least one of the selected ones of the plurality of offers includes using the retailer terminal to perform the following operations: accessing the database to identify the plurality of offers linked to the bar code, comparing the selected ones of the plurality of offers to details of the purchase to determine which of the selected ones of the plurality of offers are eligible for redemption on the purchase, and applying a financial discount corresponding to each of the plurality of offers determined to be eligible for redemption on the purchase.

19. The method of claim 18, further comprising updating, in the database, an availability status of the selected ones of the plurality of offers that correspond with the financial discount applied to the purchase.

20. The method of claim 15, further comprising:
determining if the financial instrument from the consumer is associated with a different consumer profile unassociated with the bar code, and
if the financial instrument from the consumer is associated with the different consumer profile, merging the consumer profile associated with the bar code with the different consumer profile.

21. A method of coupon generation, delivery, and redemption, the method comprising:
creating an individual customer account including prior purchasing behavior of a customer and storing the individual customer account to a database;
defining a plurality of offers for financial discount in the database;
using a generation processor to generate a coupon including:
selecting offers from a plurality of possible offers stored in the database based on the prior purchasing behavior of the customer at a retailer, wherein the generation processor accesses the individual customer account stored in the database for the customer to determine the prior purchasing behavior of the customer, and the individual customer account is associated with a financial instrument previously used by the customer to make a purchase at the retailer,
generating a code for the coupon, the code including an account identifier linking the code to the individual customer account, wherein the code links the selected offers to the coupon, and
storing the code to the database;
electronically delivering the coupon to the customer including the code;
processing the coupon at a retailer terminal in communication with the database as part of a retail transaction, wherein processing the coupon includes:
entering the code into the retailer terminal,
using the code entered into the retailer terminal to identify the selected offers,
comparing available ones of the selected offers to one or more products being purchased via retailer terminal as part of the retail transaction,
using the retailer terminal to apply a discount to a purchase price of any of the one or more products being purchased that correspond to the available ones of the selected offers,
accepting, at the retailer terminal, a financial instrument provided during the retail transaction as payment for the one or more products being purchased,
performing a status inquiry of the database to determine an availability status of each of the selected offers at the retailer terminal, and
communicating the availability status for at least a portion of the selected offers to the customer by providing the customer with a list of those of the selected offers that remain available for future use; and
comparing the financial instrument provided during the retail transaction to the financial instrument associated with the individual customer account, and if the financial instrument provided during the retail transaction differs from the financial instrument associated with the individual customer account linked to the code of the coupon provided during the retail transaction, linking the financial instrument provided during the retail transaction to the individual customer account stored in the database.

22. The method of claim 21, wherein the code is a bar code.

23. The method of claim 21, wherein each of the financial instrument associated with the individual customer account and the financial instrument provided during the retail transaction is one of a credit card and a debit card.

24. The method of claim 21, further comprising:
determining if the financial instrument provided during the retail transaction is associated with a different customer account unassociated with the code, and
if the financial instrument provided during the retail transaction is associated with the different customer account, merging the individual customer account linked to the code with the different customer account.

25. The method of claim 21, wherein entering the code into the retailer terminal includes scanning the code from the coupon.

26. The method of claim 21, wherein the generation processor is operated by the retailer, the database is maintained by the retailer, and the retailer performs at least the following: using the generation processor, electronically delivering the coupon, processing the coupon, and comparing the financial instrument provided during the retail transaction to the financial instrument associated with the individual customer account.

* * * * *